(12) United States Patent
Siladi

(10) Patent No.: US 11,523,598 B2
(45) Date of Patent: Dec. 13, 2022

(54) FISHING LIGHT ASSEMBLY

(71) Applicant: Liviu Siladi, Phoenix, AZ (US)

(72) Inventor: Liviu Siladi, Phoenix, AZ (US)

( * ) Notice: Subject to any disclaimer, the term of this patent is extended or adjusted under 35 U.S.C. 154(b) by 0 days.

(21) Appl. No.: 17/189,726

(22) Filed: Mar. 2, 2021

(65) Prior Publication Data

US 2022/0279771 A1 Sep. 8, 2022

(51) Int. Cl.
*A01K 97/12* (2006.01)
*A01K 87/00* (2006.01)

(52) U.S. Cl.
CPC ............ *A01K 97/12* (2013.01); *A01K 87/00* (2013.01)

(58) Field of Classification Search
CPC ...... A01K 97/12; A01K 87/00; A01K 97/125; A01K 97/01; A01K 99/00; F21L 4/00; F21L 4/04; F21V 3/02; F21V 3/00; F21V 11/00; F21V 21/008; F21V 33/008
See application file for complete search history.

(56) References Cited

U.S. PATENT DOCUMENTS

| | | | | | |
|---|---|---|---|---|---|
| 2,017,333 | A | * | 10/1935 | Zuck | A01K 83/06 43/42.47 |
| 2,671,209 | A | * | 3/1954 | Habib | F21V 23/0414 362/802 |
| 3,571,536 | A | * | 3/1971 | Sparks | F21L 2/00 43/17 |
| 3,913,257 | A | * | 10/1975 | Colgan | A01K 85/16 43/42.09 |
| 4,006,550 | A | * | 2/1977 | Rizzo | A01K 97/125 43/17 |
| 4,581,841 | A | * | 4/1986 | Gish | A01K 85/16 43/42.03 |
| 5,058,900 | A | * | 10/1991 | Denen | F21V 33/008 362/802 |
| 5,274,943 | A | | 1/1994 | Ratcliffe | |
| 5,357,410 | A | * | 10/1994 | Cota | A01K 87/007 362/802 |
| D403,737 | S | * | 1/1999 | Howe | D22/139 |
| D423,667 | S | * | 4/2000 | Coe | D26/38 |
| 6,058,644 | A | * | 5/2000 | Irwin | A01K 85/16 43/42.27 |
| D439,996 | S | * | 4/2001 | Bogus | D26/47 |
| 6,446,380 | B1 | * | 9/2002 | Radosavljevic | A01K 87/007 43/16 |
| 6,675,526 | B1 | * | 1/2004 | Baron | A01K 85/16 43/42.36 |
| 7,337,577 | B1 | * | 3/2008 | Ramirez | A01K 97/125 362/120 |

(Continued)

FOREIGN PATENT DOCUMENTS

WO WO2004021777 3/2004

*Primary Examiner* — Christopher P Ellis

(57) ABSTRACT

A fishing light assembly for facilitating a visual indicator for fishing at night includes a housing that has a pair of fin portions extending away from a body portion such that the housing has the ornamental appearance of a fish. The housing is comprised of a translucent material to pass light therethrough. A clip is coupled to the housing to engage a fishing rod for suspending the housing from the fishing rod. A light emitter is positioned within the housing to emit light outwardly therefrom. In this way the light emitter facilitates a visual indicator when the fishing pole is being moved from a fish that has bitten a lure connected to the fishing pole.

7 Claims, 5 Drawing Sheets

(56) References Cited

U.S. PATENT DOCUMENTS

| | | | |
|---|---|---|---|
| 9,179,659 B1 | 11/2015 | Berthiaume | |
| 10,531,651 B1* | 1/2020 | Spillett | G08B 5/36 |
| 2004/0187376 A1* | 9/2004 | Henriquez | A01K 97/125 |
| | | | 43/17 |
| 2004/0264187 A1* | 12/2004 | Vanderschuit | H01R 33/94 |
| | | | 362/235 |
| 2005/0018418 A1* | 1/2005 | Keith | A01K 87/007 |
| | | | 362/109 |
| 2014/0366426 A1* | 12/2014 | Dyer | A01K 91/06 |
| | | | 43/17.5 |
| 2016/0007581 A1* | 1/2016 | Davidson | A01K 85/01 |
| | | | 359/809 |

* cited by examiner

FISHING LIGHT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to light devices and more particularly pertains to a new light device for facilitating a visual indicator for fishing at night. The device includes a fish shaped light housing and a light emitter that is positioned within the housing. The fish shaped housing can be removably attached to a fishing rod such that the light emitter facilitates a visual indication when the fishing rod is moving from a fish being caught with the fishing rod at night.

(2) Description of Related Art Including Information Disclosed Under 37 CFR 1.97 and 1.98

The prior art relates to light devices including a variety of light emitters that are each attachable to a fishing rod for visually indicating when a fish has been caught during night fishing. Additionally, the prior art discloses a light emitter, having the ornamental appearance of a fish, that is firmly attached to a fishing rod for visually indicating when a fish has been caught during night fishing. In no instance does the prior art disclose a translucent housing, shaped like a fish, that is suspended from a fishing rod.

BRIEF SUMMARY OF THE INVENTION

An embodiment of the disclosure meets the needs presented above by generally comprising a housing has a pair of fin portions extending away from a body portion such that the housing has the ornamental appearance of a fish. The housing is comprised of a translucent material to pass light therethrough. A clip is coupled to the housing to engage a fishing rod for suspending the housing from the fishing rod. A light emitter is positioned within the housing to emit light outwardly therefrom. In this way the light emitter facilitates a visual indicator when the fishing pole is being moved from a fish that has bitten a lure connected to the fishing pole.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
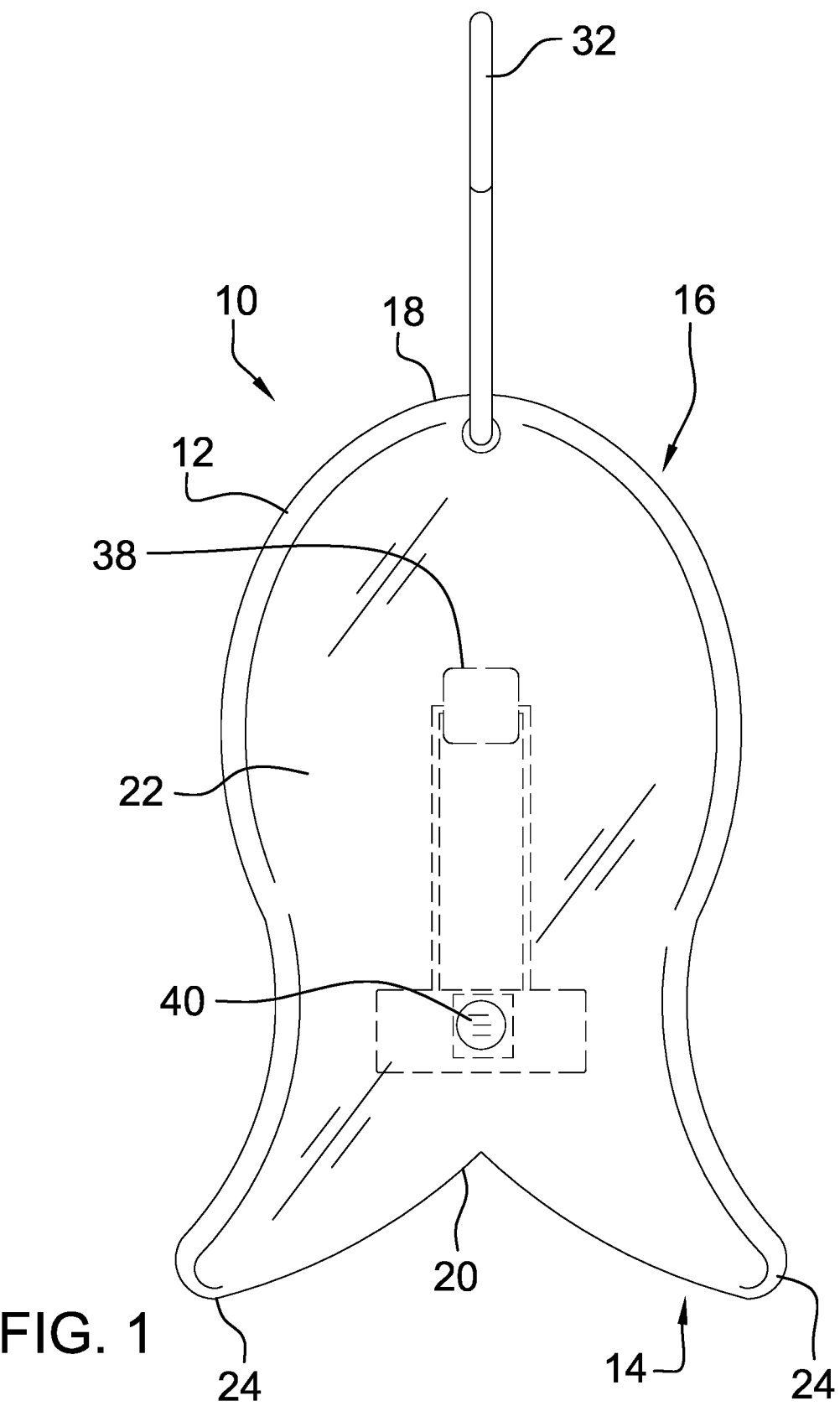
FIG. 1 is a front phantom view of a fishing light assembly according to an embodiment of the disclosure.
Figure 2:
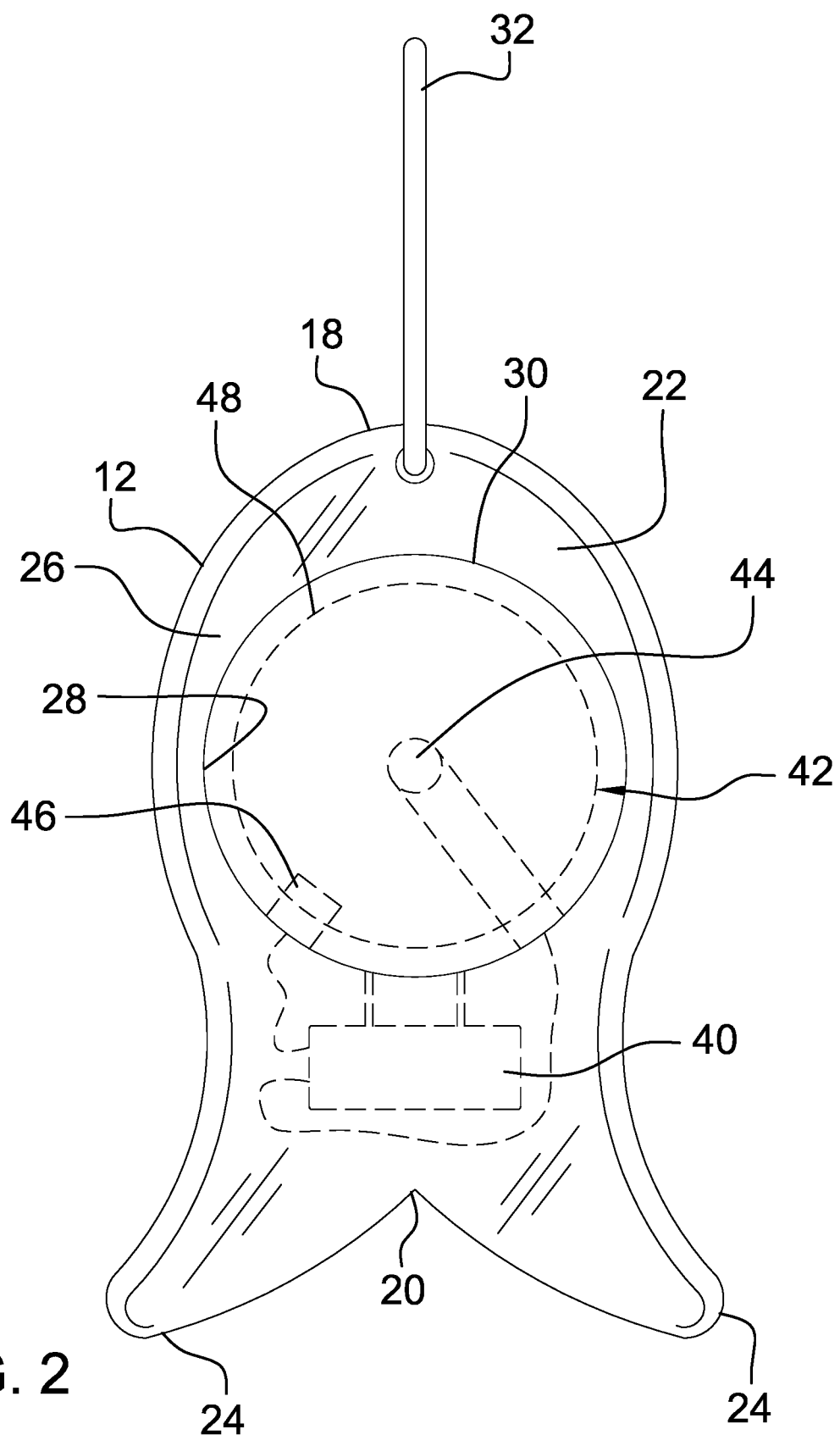
FIG. 2 is a back phantom view of an embodiment of the disclosure.
Figure 3:
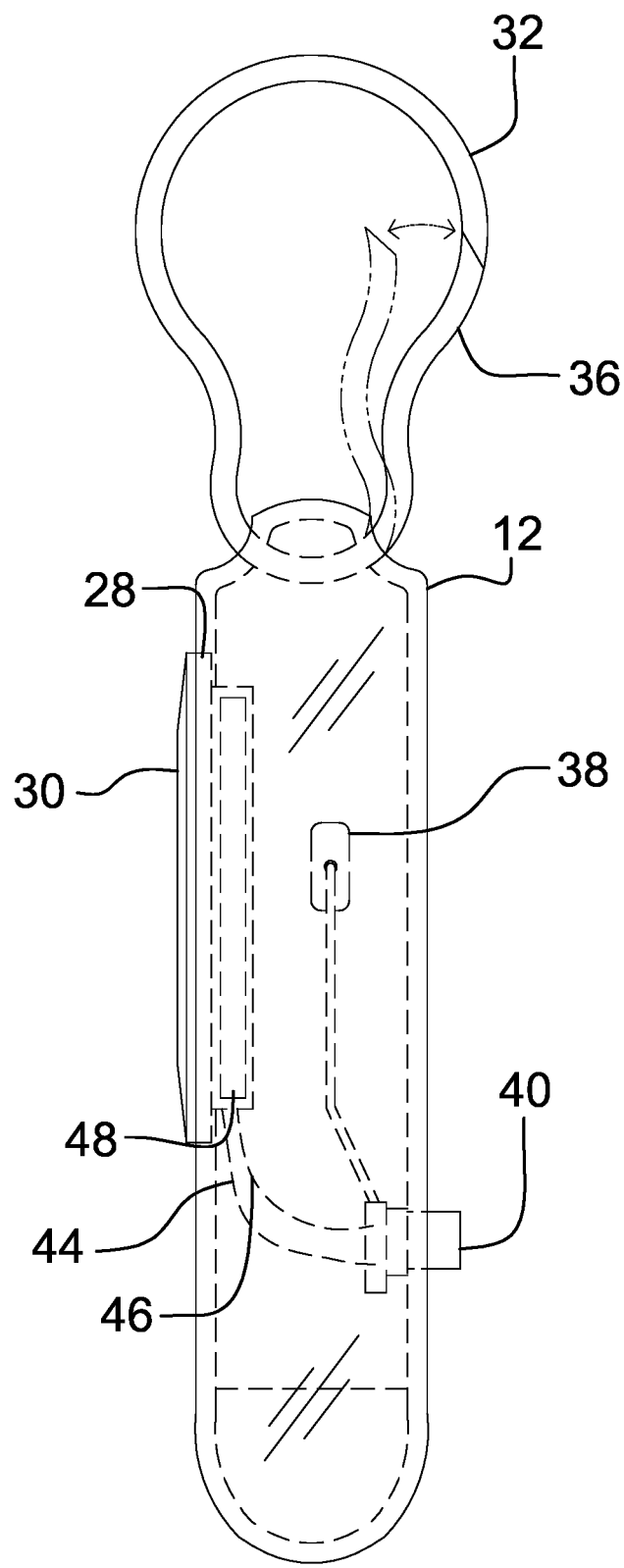
FIG. 3 is a right side phantom view of an embodiment of the disclosure.
Figure 4:
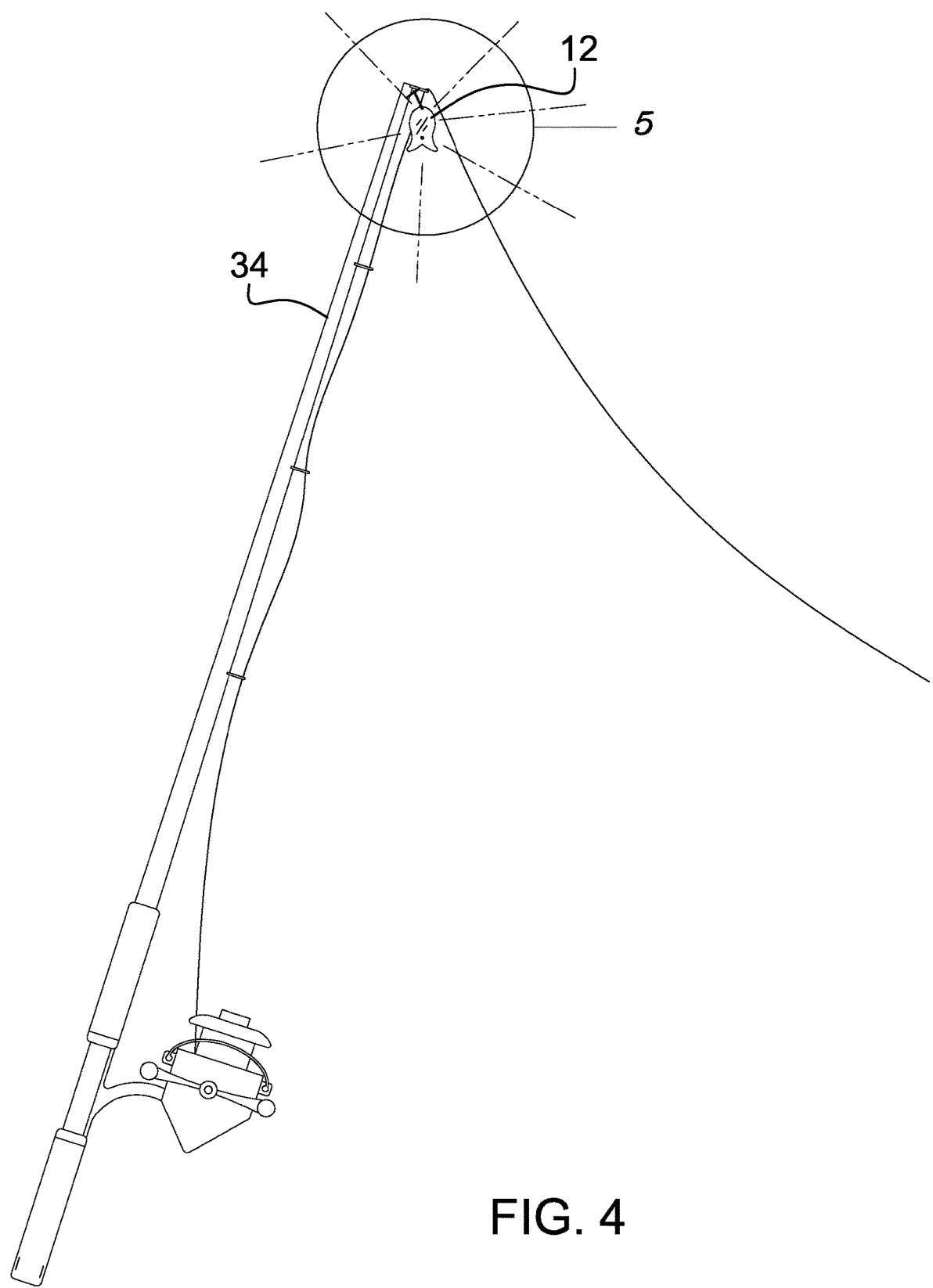
FIG. 4 is a perspective in-use view of an embodiment of the disclosure.
Figure 5:
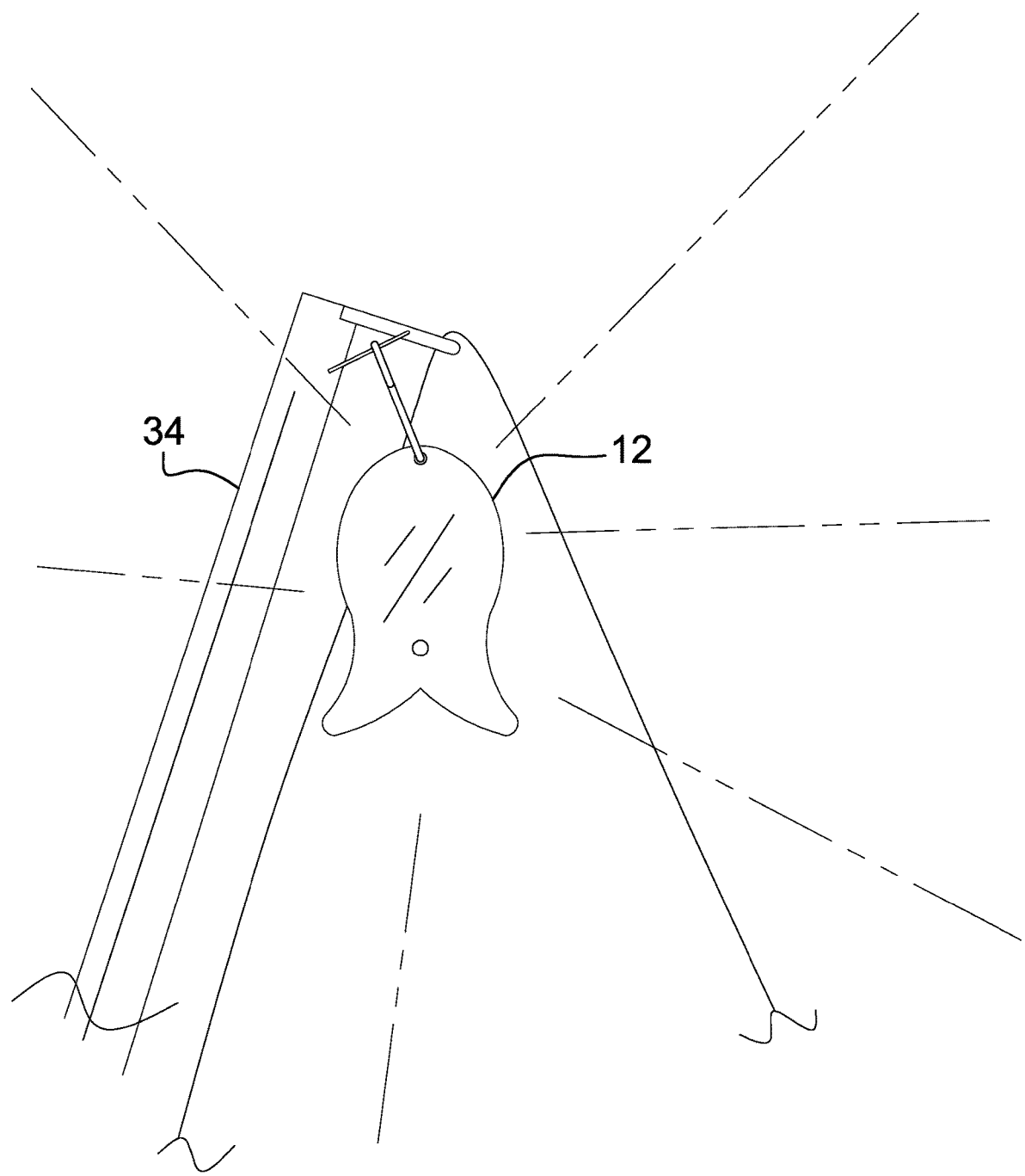
FIG. 5 is a detail view taken from circle 5 of FIG. 4 of an embodiment of the disclosure.

With reference now to the drawings, and in particular to FIGS. 1 through 5 thereof, a new light device embodying the principles and concepts of an embodiment of the disclosure and generally designated by the reference numeral 10 will be described.

As best illustrated in FIGS. 1 through 5, the fishing light assembly 10 generally comprises a housing 12 that has a pair of fin portions 14 extending away from a body portion 16 such that the housing 12 has the ornamental appearance of a fish. The housing 12 is comprised of a translucent material such that the housing 12 can pass light therethrough. The housing 12 has a first end 18, a second end 20 and an outer wall 22 extending therebetween. The first end 18 is rounded and the second end 20 is bifurcated into a pair of fins 24 each angling away from a centerline of the housing 12 such that each of the fins 24 defines the fin portion 14 of the housing 12. Additionally, the body portion 16 of the housing 12 is defined between the fins 24 and the first end 18. In this way the first end 18 suggests a head of a fish and the second end 20 suggests a tail of the fish. The outer wall 22 has a first side 26 and the first side 26 has an opening 28 extending into an interior of the housing 12.

A cap 30 is removably attachable to the outer wall 22 of the housing 12 and the cap 30 is positionable in the opening 28 for closing the opening 28. A clip 32 is coupled to the housing 12 to engage a fishing rod 34 for suspending the housing 12 from the fishing rod 34. The clip 32 extends through the outer wall 22 of the housing 12 at a point that is located adjacent to the first end 18 of the housing 12. The clip 32 has a gate 36 that is hingedly integrated therein. The gate 36 is positionable in an open position to facilitate the clip 32 to receive the fishing rod 34. Conversely, the gate 36 is biased into a closed position to retain the clip 32 on the fishing rod 34.

A light emitter 38 is positioned within the housing 12 to emit light outwardly therefrom. In this way the light emitter 38 facilitates a visual indicator when the fishing rod 34 is being moved from a fish that has bitten a lure connected to the fishing rod 34. Thus, the light emitter 38 enhances a fisherman's ability to catch fish while fishing at night. The light emitter 38 may comprise an LED or other type of electronic light emitter that is capable of emitting light in a variety of different colors. A button 40 extends through the outer wall 22 of the housing 12 such that the button 40 can be manipulated by a user. The button 40 is electrically coupled to the light emitter 38 and the button 40 turns the light emitter 38 on and off when the button 40 is depressed.

A power supply 42 is integrated into the housing 12 and the power supply 42 is electrically coupled to the light emitter 38. The power supply 42 comprises a positive contact 44 is positioned in the housing 12 and the positive contact 44 is electrically coupled to the light emitter 38. A negative contact 46 is positioned in the housing 12 and the negative contact 46 is electrically coupled to the light emitter 38. Additionally, the negative contact 46 is spaced from the positive contact 44. The power supply 42 includes a battery 48 that is insertable into the opening in the outer wall 22 of the housing 12. The battery 48 is in electrical communication with each of the positive contact 44 and the negative contact 46 when the battery 48 is inserted into the housing 12.

In use, the clip 32 is engaged to a desired location on the fishing rod 34 to suspend the housing 12 from the fishing rod 34. The button 40 is held for a period of approximately 3.0 seconds in order to turn on the light emitter 38. Additionally, the button 40 can be quickly depressed and released in order to change the color of the light that is emitted by the light emitter 38. In this way the housing 12 is visible to the fisherman when the fisherman is fishing at night. Thus, the fisherman can visually identify when the fishing rod 34 is moving as the result of a fish being hooked on the lure employed for fishing.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fishing light assembly for generating a visual indication that a fish is on a fishing pole, said assembly comprising:
   a housing having a pair of fin portions extending away from a body portion wherein said housing is configured to have the ornamental appearance of a fish, said housing being comprised of a translucent material wherein said housing is configured to pass light therethrough;
   a clip being coupled to said housing, said clip forming a closed loop when in a closed position wherein said clip is configured to engage a support brace of a line guide of a fishing rod for suspending said housing from the fishing rod at an end of the fishing pole; and
   a light emitter being positioned within said housing wherein said light emitter is configured to emit light outwardly therefrom for facilitating a visual indicator when the fishing pole is being moved from a fish that has bitten a lure connected to the fishing pole.

2. The assembly according to claim 1, wherein said housing has a first end, a second end and an outer wall extending therebetween, said first end being rounded, said second end being bifurcated into a pair of fins each angling away from a centerline of said housing, said outer wall having a first side, said first side having an opening extending into an interior of said housing.

3. The assembly according to claim 2, wherein said clip extends through said outer wall of said housing at a point being located adjacent to said first end of said housing, said clip having a gate being hingedly integrated therein, said gate being positionable in an open position wherein said gate is configured to facilitate said clip to receive the fishing rod, said gate being biased into the closed position wherein said gate is configured to retain said clip on the fishing rod.

4. The assembly according to claim 2, further comprising a button extending through said outer wall of said housing wherein said button is configured to be manipulated by a user, said button being electrically coupled to said light emitter, said button turning said light emitter on and off when said button is depressed.

5. The assembly according to claim 2, further comprising a power supply being integrated into said housing, said power supply being electrically coupled to said light emitter, said power supply comprising:
   a positive contact being positioned in said housing, said positive contact being electrically coupled to said light emitter;
   a negative contact being positioned in said housing, said negative contact being electrically coupled to said light emitter, said negative contact being spaced from said positive contact; and
   a battery being insertable into said opening in said outer wall of said housing, said battery being in electrical communication with each of said positive contact and said negative contact when said battery is inserted into said housing.

6. A fishing light assembly for generating a visual indication that a fish is on a fishing pole, said assembly comprising:
   a housing having a pair of fin portions extending away from a body portion wherein said housing is configured to have the ornamental appearance of a fish, said housing being comprised of a translucent material wherein said housing is configured to pass light therethrough, said housing having a first end, a second end and an outer wall extending therebetween, said first end being rounded, said second end being bifurcated into a pair of fins each angling away from a centerline of said housing, said outer wall having a first side, said first side having an opening extending into an interior of said housing;
- a cap being removably attachable to said outer wall of said housing, said cap being positionable in said opening for closing said opening;
- a clip being coupled to said housing, said clip forming a closed loop when in a closed position wherein said clip is configured to engage a support brace of a line guide of a fishing rod for suspending said housing from the fishing rod at an end of the fishing pole, said clip extending through said outer wall of said housing at a point being located adjacent to said first end of said housing, said clip having a gate being hingedly integrated therein, said gate being positionable in an open position wherein said gate is configured to facilitate said clip to receive the fishing rod, said gate being biased into the closed position wherein said gate is configured to retain said clip on the fishing rod;
- a light emitter being positioned within said housing wherein said light emitter is configured to emit light outwardly therefrom for facilitating a visual indicator when the fishing pole is being moved from a fish that has bitten a lure connected to the fishing pole;
- a button extending through said outer wall of said housing wherein said button is configured to be manipulated by a user, said button being electrically coupled to said light emitter, said button turning said light emitter on and off when said button is depressed; and
- a power supply being integrated into said housing, said power supply being electrically coupled to said light emitter, said power supply comprising:
  - a positive contact being positioned in said housing, said positive contact being electrically coupled to said light emitter,
  - a negative contact being positioned in said housing, said negative contact being electrically coupled to said light emitter, said negative contact being spaced from said positive contact; and
  - a battery being insertable into said opening in said outer wall of said housing, said battery being in electrical communication with each of said positive contact and said negative contact when said battery is inserted into said housing.

7. A fishing light system for generating a visual indication that a fish is on a fishing pole, said assembly comprising:
- a fishing pole having a line guide, said line guide having a support brace, said line guide being positioned at an end of said fishing pole;
- a housing having a pair of fin portions extending away from a body portion wherein said housing is configured to have the ornamental appearance of a fish, said housing being comprised of a translucent material wherein said housing is configured to pass light therethrough, said housing having a first end, a second end and an outer wall extending therebetween, said first end being rounded, said second end being bifurcated into a pair of fins each angling away from a centerline of said housing, said outer wall having a first side, said first side having an opening extending into an interior of said housing;
- a cap being removably attachable to said outer wall of said housing, said cap being positionable in said opening for closing said opening;
- a clip being coupled to said housing, said clip forming a closed loop when in a closed position, said clip engaging said support brace of said line guide of said fishing rod for suspending said housing from said fishing rod at the end of the fishing pole, said clip extending through said outer wall of said housing at a point being located adjacent to said first end of said housing, said clip having a gate being hingedly integrated therein, said gate being positionable in an open position thereby facilitating said clip to receive said fishing rod, said gate being biased into a closed position to retain said clip on said fishing rod;
- a light emitter being positioned within said housing wherein said light emitter is configured to emit light outwardly therefrom for facilitating a visual indicator when said fishing pole is being moved from a fish that has bitten a lure connected to said fishing pole;
- a button extending through said outer wall of said housing wherein said button is configured to be manipulated by a user, said button being electrically coupled to said light emitter, said button turning said light emitter on and off when said button is depressed; and
- a power supply being integrated into said housing, said power supply being electrically coupled to said light emitter, said power supply comprising:
  - a positive contact being positioned in said housing, said positive contact being electrically coupled to said light emitter;
  - a negative contact being positioned in said housing, said negative contact being electrically coupled to said light emitter, said negative contact being spaced from said positive contact; and
  - a battery being insertable into said opening in said outer wall of said housing, said battery being in electrical communication with each of said positive contact and said negative contact when said battery is inserted into said housing.

\* \* \* \* \*